US009021526B1

(12) United States Patent
Baron et al.

(10) Patent No.: US 9,021,526 B1
(45) Date of Patent: Apr. 28, 2015

(54) VIDEO NAVIGATION PREVIEW

(71) Applicant: Amazon Technologies, Inc., Reno, NV (US)

(72) Inventors: Bradley Michael Baron, Seattle, WA (US); Richard Judd Winograd, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 13/887,208

(22) Filed: May 3, 2013

(51) Int. Cl.
*G06F 3/00* (2006.01)
*G06F 13/00* (2006.01)
*H04N 5/445* (2011.01)
*H04N 21/482* (2011.01)

(52) U.S. Cl.
CPC .................................. *H04N 21/482* (2013.01)

(58) Field of Classification Search
USPC .................... 725/38, 41, 43, 52, 61
See application file for complete search history.

(56) References Cited

U.S. PATENT DOCUMENTS

| 7,185,283 B1* | 2/2007 | Takahashi ...................... 715/723 |
| 8,239,359 B2* | 8/2012 | Barsook et al. ................ 707/706 |
| 2008/0127270 A1* | 5/2008 | Shipman et al. ................ 725/46 |
| 2011/0191679 A1* | 8/2011 | Lin et al. ........................ 715/716 |

* cited by examiner

*Primary Examiner* — Mulugeta Mengesha
(74) *Attorney, Agent, or Firm* — Thorpe, North & Western LLP

(57) ABSTRACT

A method is described for providing a navigation preview file for a video. The method may include identifying a number of content images that may be associated with a video. An arrangement of the content images may be determined that may provide a low granularity preview of the entire length of the associated video where the low granularity preview increasingly becomes more granular as the content images are received on a client device. A navigation preview file may then be constructed according to the arrangement of the content images.

19 Claims, 10 Drawing Sheets

VIDEO NAVIGATION PREVIEW

BACKGROUND

Increases in network speeds combined with the benefits associated with viewing content from one's own home have resulted in the growing popularity of consuming content over a network. For example, a customer may watch a movie at home, without having to drive to a video rental store. In addition, the customer may avoid being inconvenienced by having to watch the movie at a pre-scheduled time (e.g., during a live television broadcast or according to play times at a movie theater). The ability to watch content over a network at a desired time provides flexibility to the customer's schedule. Furthermore, the customer may select from a wide variety of content based on individual preference and/or mood. For example, the customer may select from movies, television series, instructional videos, video logs to name just a few. In addition, the ability to watch content on a wide variety of devices (e.g., desktop computers, laptop computers, televisions, cell phones, gaming systems, tablet computers) may provide the additional convenience of watching the content in a variety of places (e.g., a coffee place, bookstore, or mall).

In addition to having access to a variety of content, consuming content over a network may allow the customer to take advantage of navigational features that may be available when viewing content over a network. For example, a customer may preview a segment of a movie via still image frames without having to skip to the actual segment of the movie. For instance, the customer may have access to a navigation preview that may display still content images captured from the movie when the navigation preview is activated by the customer. The content images may be associated with segments of the movie so that if the customer selects the content image from the navigation preview, then the movie play point may be repositioned to the segment selected by the customer.

DETAILED DESCRIPTION

Figure 1:
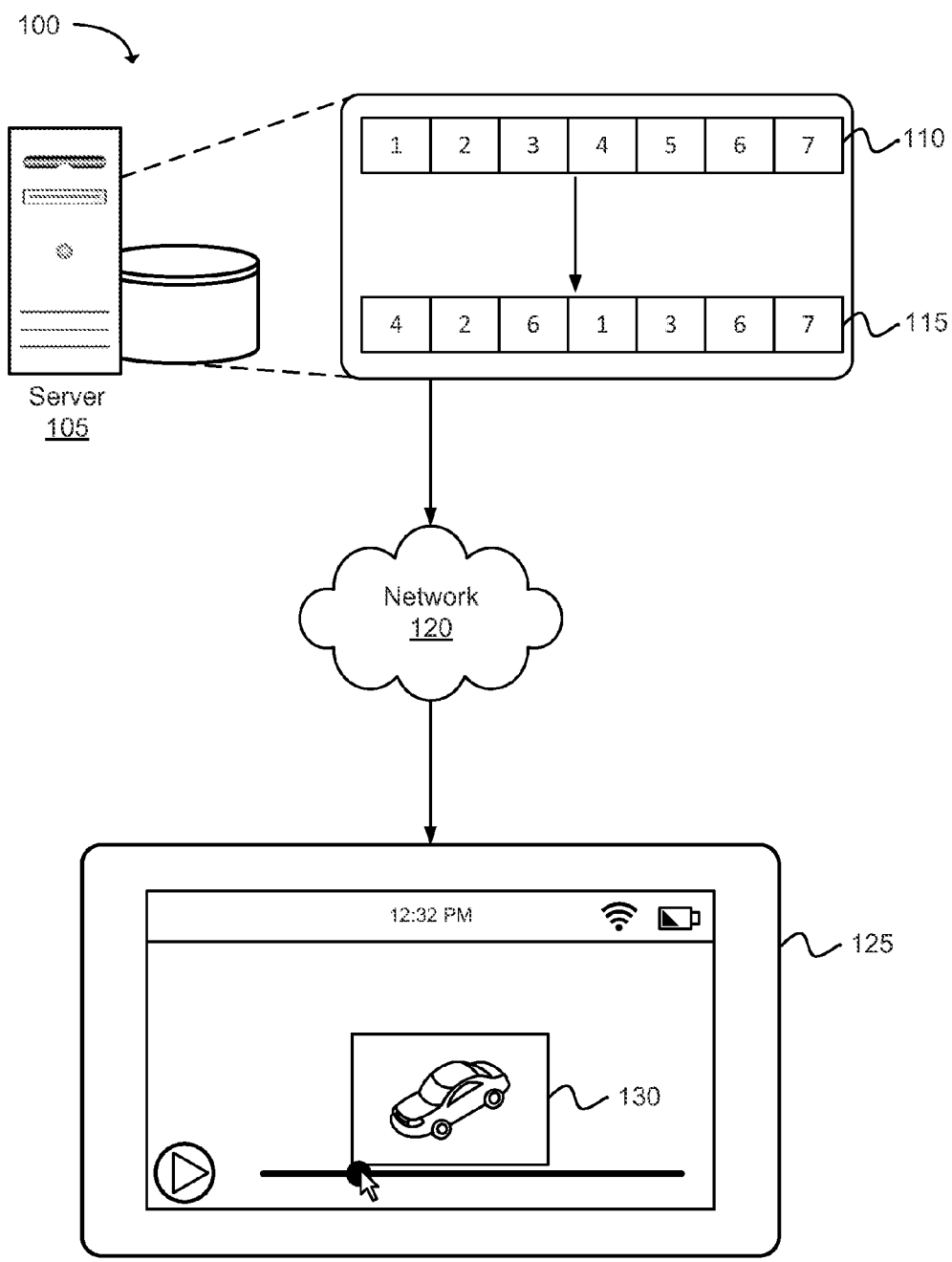
FIG. 1 is a diagram illustrating an example system for providing a navigation preview file for a streaming video.

A technology is provided for navigating content obtained over a network in an interactive manner. A video navigation preview file containing a number of content images may be provided to a client device. The content images in the video navigation preview file may be arranged so that as the video navigation preview file is received on the client device, a low granularity preview of the entire length of the video may initially be provided to a customer followed by a more granular preview (e.g., more detailed preview) of the entire length of the video as additional portions of the video navigation preview file are received.

A customer may watch content (e.g., a movie, a television show, video, etc.) on a device connected to a network. The content may be streamed over a network, transmitted in burst mode, partially downloaded, or any other suitable mechanism for transferring content over a network. While watching content, the customer may perform a number of actions which may enhance the viewing experience. For example, the customer may desire to skip ahead to a segment of the movie or go back to an earlier segment of the movie. One way a customer may navigate content is by manipulating a navigation bar, which may also be referred to as a scrubber bar, timeline bar or slider bar. The navigation bar may be a component of a media application used to play content streamed over a network. By operating (e.g., selecting and dragging) the navigation bar, a customer may move forward or backward in time through content to a point that the customer wishes to view.

Associated with the navigation bar may be a navigation preview that, in one example, may become visible in the media application when the navigation bar is operated. The navigation preview may be a number of content images (e.g., still images) from throughout a video that provide a customer with a visual timeline of the video, which the customer may use to navigate forward or backward in the video. A navigation preview may display a content image for a predetermined segment of a video. For example, a content image may represent a segment of one second, ten seconds, one minute, five minutes or some other segment of time. In one example, a customer may move the navigation bar forward or backward from the navigation bar's current position to a point where the navigation preview content image displays a scene that the customer wishes to watch. For example, if the customer wishes to move to a scene in a movie where intense action may be taking place, the customer may move the navigation bar until the navigation preview displays a content image of the intense action scene that the customer may be looking for. Upon releasing the navigation bar, the movie play point may be moved to the point associated with the navigation preview content image.

Along with a video file streamed over a network to a device, a video navigation preview file containing navigation preview content images for the video may be downloaded from a server to a device. The technology may arrange content images contained in a video navigation preview file in an order that provides a low granularity navigation preview of the entire length of the video. A low granularity navigation preview may be a preview of a video that contains a number of content images representing a number of segments of the video over the entire length of the video (i.e., the entire length of the video may be represented by the content images), but does not yet contain a content image for every segment of the video. In other words, the low granularity navigation preview may contain gaps in the navigation preview of the video, but still provides a navigation preview for the entire length of the video. The granularity of the navigation preview increasingly becomes more granular (e.g., more densely populated) as the video navigation preview file is transferred to or downloads to a device. More specifically, the low granularity navigation preview provided by the video navigation preview file may be a preview of the length of the video as a whole, in contrast to a preview of just the beginning of the video or a segment of the video. For example, the content images may be ordered so that the content image in the first position of the video navigation preview file may be a content image from the halfway point of a video. The content image in the second position of the video navigation preview file may be a content image from near the end of the video. The device may load and display the content images as the content images are received and as additional content images are downloaded, the content images may be in an order that gradually fills out the navigation preview in a pre-defined pattern. For example, a pre-defined pattern may first provide a content image for every one minute of a video, then every 30 seconds of a video, then every 15 seconds of the video and so on. Another pre-defined pattern may provide a content image for selected chapters or scenes of a video before filling in other chapters and then segments of the navigation preview.

Once an initial number of content images are placed into the navigation preview, a low granularity preview of the video may be available to a customer. For example, a content image may be displayed for the first quarter of a navigation preview; a second content image may be displayed for the second quarter of the navigation preview; a third content image for the third quarter; and a fourth content image may be displayed for the last quarter of the navigation preview. As the video navigation preview file continues to download and content images are loaded into the navigation preview, the navigation preview may become more granular, and provide the customer with a finer level of navigation or preview detail for segments of the video. As in the example above, content images may further be displayed at eights, sixteenths and additional points in the video as the additional content images are received.

FIG. 1 is a system diagram illustrating an example of a networked computing environment 100 that may be used to execute the technology. A server 105 may provide a client device 125 with a video navigation preview file over a network 120. The video navigation preview file 110 may contain a plurality of content images (i.e., still images captured from a video) that may be arranged sequentially in the video navigation preview file 110. For example, the content images in the video navigation preview file 110 may be arranged in a sequence that follows the sequence of an associated video. For example, position one of the video navigation preview file 110 may contain a content image from the first segment of the video. The second position of the video navigation preview file 110 may contain a content image from the next segment of the video and so on.

To provide a customer with an initial low granularity navigation preview 130 of an entire length of a video, a method may be executed on the server that rearranges the content images contained in the video navigation preview file 110. By rearranging the content images in the video navigation preview file 110, an ordering of content images may be provided in a video navigation preview file 115 that provides an initial general overview of the video that becomes more granular as additional content images are received by the client device 125. The content image in the first position of the video navigation preview file 115 may contain a content image from a later point in the video (e.g., midpoint). The next position of the video navigation preview file 115 may contain a content image from near the beginning of the video (e.g., the 25% point or 15% completion point), while a third position of the navigation file may contain a content image from near the end of the file (e.g. 75% or 90% completion) and so forth. Upon receiving the content images for the first few positions of the video navigation preview file, a customer may be provided with a high level preview of the entire video. As the video navigation preview file 115 continues to download to the client device 125, the navigation preview 130 on the client device 125 may become more granular as missing positions of the navigation preview 130 may be filled with content images received from the video navigation preview file 115. Once the video navigation preview file 115 may be fully downloaded to the client device 125, the content image positions of the client device's navigation preview 130 may be occupied by a content image.

Figure 2:
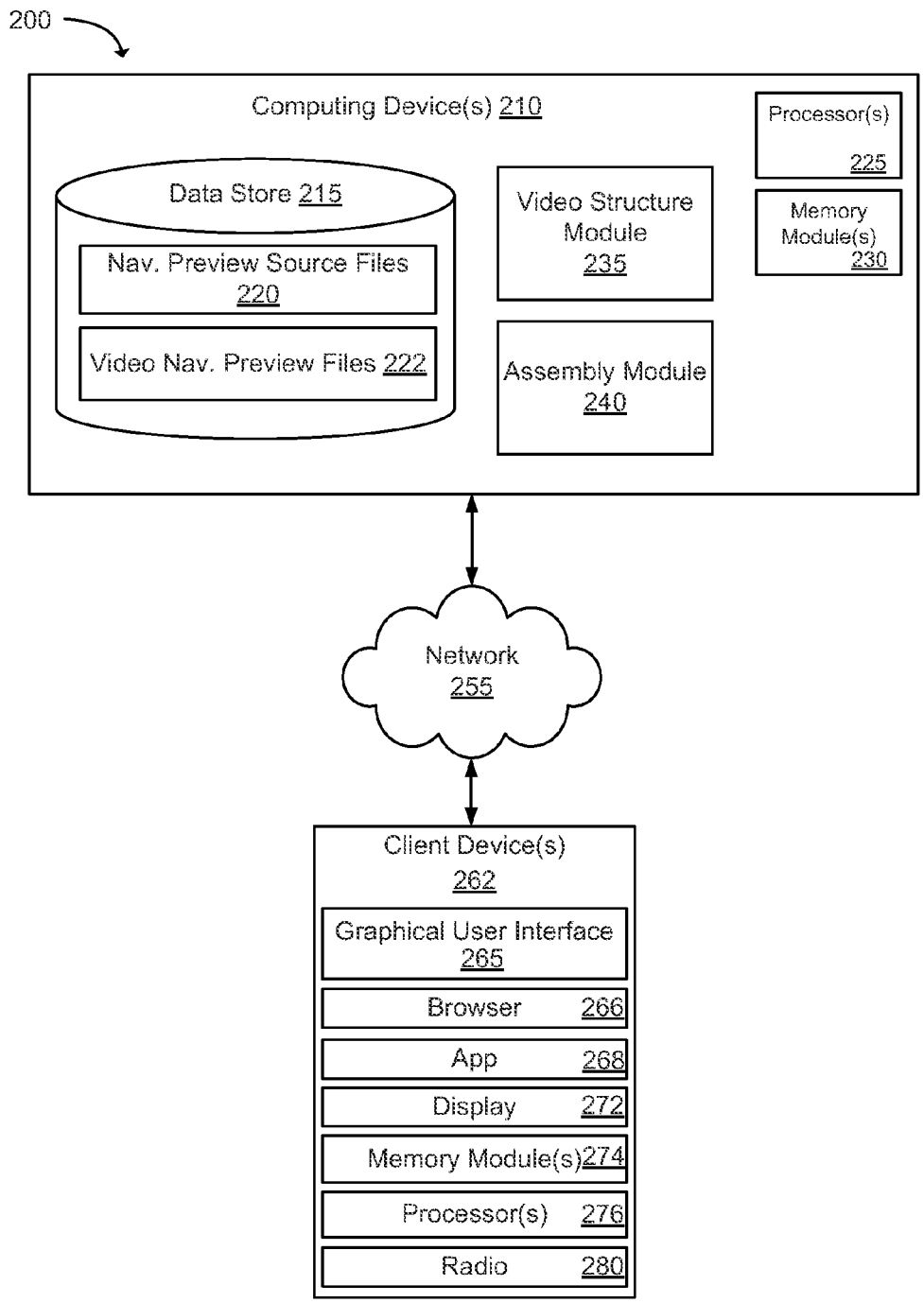
FIG. 2 is a block diagram illustrating an example system for providing a video navigation preview file to a client device.

FIG. 2 illustrates an example system 200 that may be used to provide a video navigation preview file to a number of client devices 262. The system 200 may contain one or more computing devices 210 that may be in data communication with one or more client devices 262 by way of a wired or wireless network 255. A client device may include, but is not limited to, a desktop computer, notebook or laptop computer, smart TV, home theater computer, tablet computer, cell phone, smart phone, digital music player, e-book reader and other devices with like capability.

Various applications and/or other functionality may be executed in the computing device 210 including certain modules to perform desired functions for the technology. For example, the computing device 210 may include a video structure module 235, an assembly module 240 and other services, processes, systems, engines, or functionality not discussed in detail herein. The video structure module 235 may be configured to build a data structure using a navigation preview source file 220.

The navigation preview source file 220 may contain a number of sequentially ordered content images for a video. In one example, the video structure module 235 may retrieve a navigation preview source file 220 from a data store 215 that may contain a number of content images from a video. The content images contained in the navigation preview source file 220 may be a series of still images captured from specific points in a video. For example, a content image may be captured from a point in a video that represents a segment of time in the video file, such as one minute, thirty seconds, ten seconds, one second or any other segment of time depending upon the granularity desired for the navigation preview. The content image may provide a customer with a preview of the video beginning at the segment of time represented by the content image.

The video structure module 235 may build a data structure containing a number of content images from the navigation preview source file 220. The data structure may enable a process or application (e.g., a video player) to retrieve content images from the data structure in an order that may be associated with the data structure. For example, content images from a navigation preview source file 220 may be placed in a data structure so that when the content images are later retrieved from the data structure, the content images are in a predetermined order for the video navigation preview file 222. For example, one type of data structure or data ordering that may be constructed by the video structure module 235 and used to create the video navigation preview file 222 may be a tree data structure. Each node of the tree data structure may be associated with a content image's index value in a navigation preview source file 220. As such, node one of a tree data structure may be associated with a content image in a mid-position of a navigation preview source file 220. Node two of the tree data structure may be associated with a content image within a first quarter of the navigation preview source file 220 and so on.

The assembly module 240 may be configured to assemble the video navigation preview file 222 from the data structure built by the video structure module 235. The assembly module 240 may assemble the video navigation preview file 222 according to an arrangement of content images that provides a navigation preview of the video on the client device 262 at a low granularity and the navigation preview increases in granularity as the video navigation preview file 222 may be progressively transferred across a network 255 to the client device 262. For example, as a client device 262 receives a video navigation preview file 222 from the computing device 210, the client device 262 may insert content images as the content images are received into an application 268 for content playback with a navigation preview that may be provided on the client device's display 272. The content images may contain an index value that may enable the client device 262 to insert the content images into a position in the navigation preview that corresponds to the content image's index value. Thus, content images that may represent a segment of the video located at the middle of the video may be inserted into a corresponding position in the navigation preview.

The video navigation preview file 222 may be assembled according to a sequence of content images provided by the assembly module search process that traverses a data structure. In one example, a tree data structure may be used and the assembly module 240 may use a search process that traverses the tree data structure to retrieve content images and assemble a video navigation preview file 222. Tree data structure traversal may refer to the process of examining and/or visiting each node in a tree data structure using a systematic process. Tree data structure traversal may be classified by the order in which the nodes of the tree data structure may be visited. Unlike linear ordered data structures, tree data structures may be traversed non-linearly and therefore, starting at the root of a tree data structure, the tree may be traversed by traveling to the left child node or to the right child node.

A method for tree data structure traversal may include a level order traversal method. The level order traversal method may also be referred to as a breadth first traversal. In one example, the assembly module 240 may use a level order traversal method to traverse a tree data structure where the method may first traverse the root of the tree data structure and then traverse the child nodes of the root starting with the left child node. The level order traversal method may then traverse the grandchild nodes again starting from the left side of the tree data structure at the furthest left grandchild node. The level order traversal method may continue to traverse the tree data structure in the same fashion until the nodes of the tree data structure have been traversed. In an example where content images of a navigation preview source file 220 may be distributed throughout the branches of a tree data structure, a level order traversal method may provide to the assembly module 240 an order of content images that allows the assembly module 240 to assemble a video navigation preview file 222 in a sequence where the content images provide a low granularity navigation preview of the entire length of the video that increases to a higher granularity navigation preview over time as the video navigation preview file 222 is received at the client device 262. For example, a balanced tree data structure may be a tree data structure where the content images of a video may be distributed throughout the nodes of the different branches of the tree data structure. By distributing the content images throughout the tree data structure, content images representing various segments of the video (e.g., beginning, middle and end) may be placed in nodes that when traversed, provides an order of content images that may quickly provide an overall preview of a video within the initial content images being received by the client device 262.

As a data structure is traversed, the assembly module 240 may place a content image returned from the traversal process into a video navigation preview file 222. For example, where the traversal process returns the content images indexed 15, 7, 23 and 4 (out of 30 preview images), the content images may be placed in the video navigation preview file 222 in the same order (i.e., 15, 7, 23 and 4). Thus, when the client device 262 receives the video navigation preview file 222 containing the content images, the client device 262 may insert the content images, as the content images are received, in the position of the navigation preview that may be associated with the content images (e.g., indexed content image 15 may be placed in position 15 of the navigation preview even though content image 15 is received first over the network). Upon assembling a video navigation preview file 222 for a video, the assembly module 240 may, in one example, store the video navigation preview file 222 in the data store 215, and the video navigation preview file 222 may be made available to a number of different client devices 262 upon request.

Alternatively, the assembly module 240 may map the content images of the navigation preview source file 220 directly to a video navigation preview file 222 based upon an ordering determined by the assembly module 240. For example, the content image at the mid-point of the navigation preview source file 220 may be mapped to the first position of the video navigation preview file 222. The content image at the ¼ point of the navigation preview source file 220 may be mapped to the second position of the video navigation preview file 222. Next, the content image from the ¾ point of the navigation preview source file 220 may be mapped to the third position of the video navigation preview file 222. The process may continue until the content images from the navigation preview source file 220 may be mapped to the video navigation preview file 222. While a sub-divisional type of mapping is described above any other useful mathematical mapping or custom mapping may be used that provides a low granularity navigation preview of an entire video file that may increase to a higher granularity file as the video navigation preview file is progressively received.

A client device 262 may include any device that may be capable of sending and receiving data over a network 255. A client device 262 may comprise, for example a processor-based system such as a computing device. Such a computing device may contain one or more processors 276, one or more memory modules 274 and a graphical user interface 265. A client device 262 may be a device such as, but not limited to, a desktop computer, laptop or notebook computer, tablet computer, cell phone, smart phone, e-book reader, digital music player or other devices with client capability. The client device 262 may include a browser 266 that may enable the client device 262 to receive and display a streamed video played in the browser 266. Also, the client device 262 may have one or more applications 268 installed that may play content (e.g. video) within the application 268. The client device 262 may include a display 272, such as a liquid crystal display (LCD) screen, gas plasma-based flat panel display, LCD projector, cathode ray tube (CRT), or other types of display devices, etc. Additionally, the client device 262 may contain a radio 280 that enables the client device 264 to connect to a network 255 by way of a wireless local area network connection such as WI-FI or Bluetooth®.

The computing device 210 may comprise, for example, a server or any other system providing computing capability. Alternatively, a number of computing devices 210 may be employed that are arranged, for example, in one or more server banks or computer banks or other arrangements. For purposes of convenience, the computing device 210 is referred to in the singular, it is understood that a plurality of computing devices 210 may be employed in the various arrangements as described above. The computing device 210 may contain various processes and/or other functionality that may be executed on one or more processors 225 that are in communication with one or more memory modules 230 according to various examples. Various data may be stored in a data store 215 that is accessible to the computing device 210. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 215 may include storage systems such as a SAN (Storage Area Network), cloud storage network, volatile or non-volatile RAM, optical media, or hard-drive type media. The data store 215 may be representative of a plurality of data stores 215 as can be appreciated.

The network 255 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system. An application program interface (API) may be provided for each module to enable a second module to send requests to and receive output from the first module. Such APIs may also allow third parties to interface with the module and make requests and receive output from the modules. While FIG. 2 illustrates an example of a system 200 that may implement the techniques above, many other similar or different environments are possible. The example environment discussed and illustrated above are merely representative and not limiting.

Figure 3:
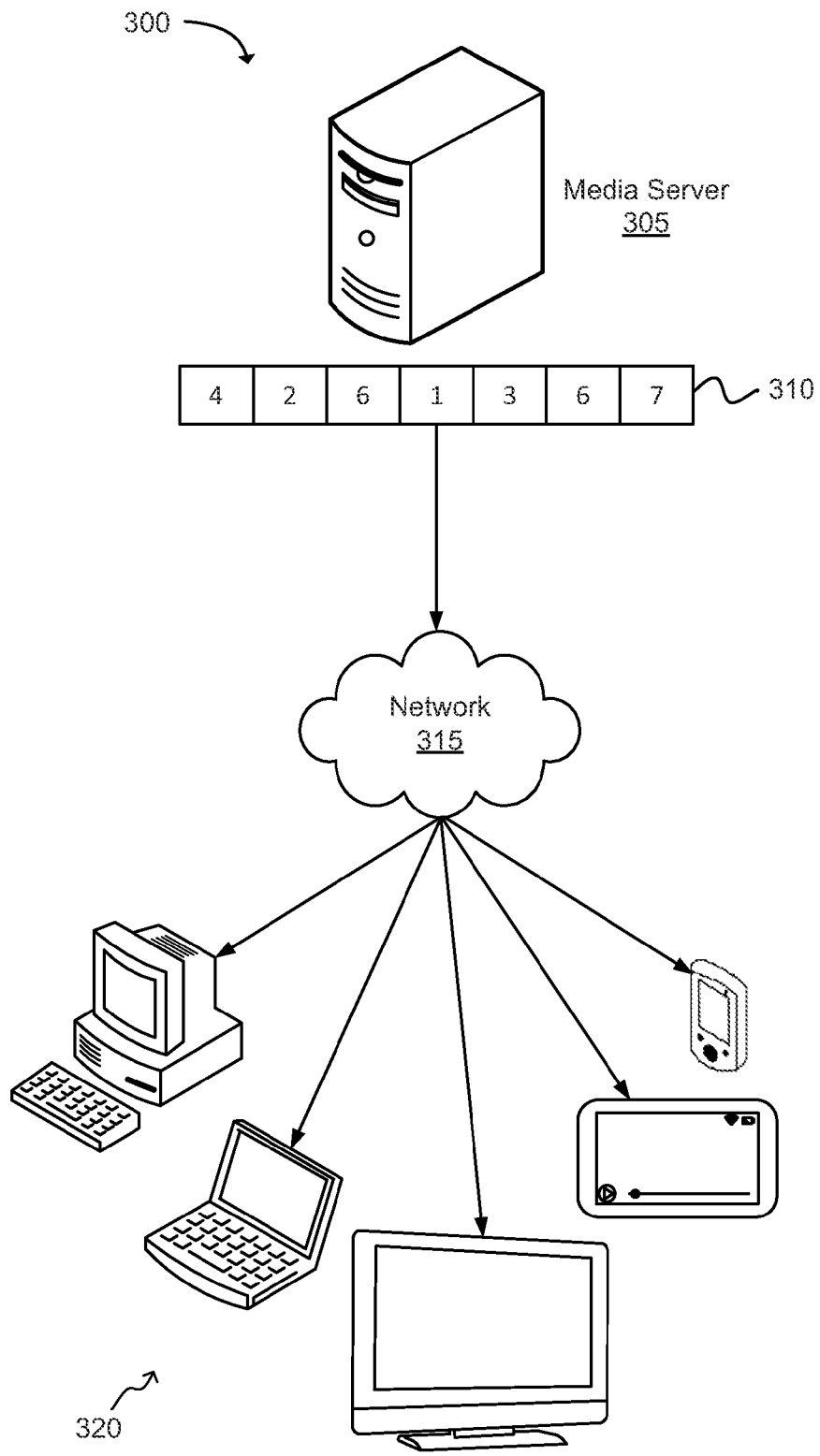
FIG. 3 is a diagram illustrating an example environment for providing a video navigation preview file to a plurality of client devices.

FIG. 3 is a system diagram illustrating an example of a networked computing environment 300 that may be used to provide a number of client devices 320 with a video navigation preview file 310. The networked computing environment 300 may include a media server 305 that may provide to a number of client devices 320 with video along with a video navigation preview file 310 over a network 315. The media server 305 may send the video navigation preview file 310 to a client device 320 concurrently with the video being sent. Thus, as a client device 320 may be receiving and playing video content, the video navigation preview file 310 may be received by the client device 320 and content images contained in the video navigation preview file 310 may be placed in a navigation preview that a customer may access and view as content images are being added to the navigation preview.

The video navigation preview file 310 provided by the media server 305 may contain a number of content images that may be arranged in a predetermined order. By arranging the content images contained in the video navigation preview file 310 in the predetermined order, a customer may be initially provided with a rough, low granularity overview of a streaming video via the navigation preview. As additional content images are received by the client device 320 and added to the navigation preview, the navigation preview may become more granular, namely, the navigation preview may obtain a content image for the segments of a streamed video over time.

The client devices 320 included in the networked computing environment 300 may include any device that may be capable of receiving streaming video over a network 315. For instance, a client device 320 may include a desktop computer, notebook or laptop computer, smartphone, tablet computer, smart TV, set-top box, game console, etc. Client devices 320 may contain an application (e.g., browser, video player, media player) that may enable a client device 320 to play streamed content. An application may include controls that allow a customer to control the play of streamed content. For example, controls may allow a customer to play, pause, stop, fast forward, reverse, etc. the play of streamed content. The application's controls may be controlled via an auxiliary device (e.g., pointing device) associated with a cursor displayed on a client device's display screen. For example, a computer mouse may be used operate an application's controls by clicking, dragging, scrolling, hovering, etc. Some client devices 320 may have a touch screen display that allows a customer to control an application by touching the client device's display screen. Also, some client devices 320 may be controlled via a remote control device (e.g., TV remote control, gaming control pad, etc.) that may allow a customer to navigate an application using the remote control device.

As described above, a customer may control the play of streaming video via the controls integrated into an application. Among the controls, an application may contain a navigation bar that a customer may use to navigate a video. The customer may move the navigation bar forward or backwards depending upon what point of the video may be playing. A navigation preview may be associated with the navigation bar that may provide a customer with a preview of different segments of a video. In one example, when a customer accesses the navigation bar (e.g., by clicking the navigation bar, hovering a cursor over the navigation bar, moving the navigation bar via a touch screen, selecting the navigation bar using a remote control, etc.) the navigation preview may be displayed to the customer. The navigation preview may display a content image that corresponds to the position of the navigation bar that the customer may be accessing. By accessing any portion of a navigation bar, a customer may preview the corresponding segment of the video by way of the navigation preview.

Figure 4:
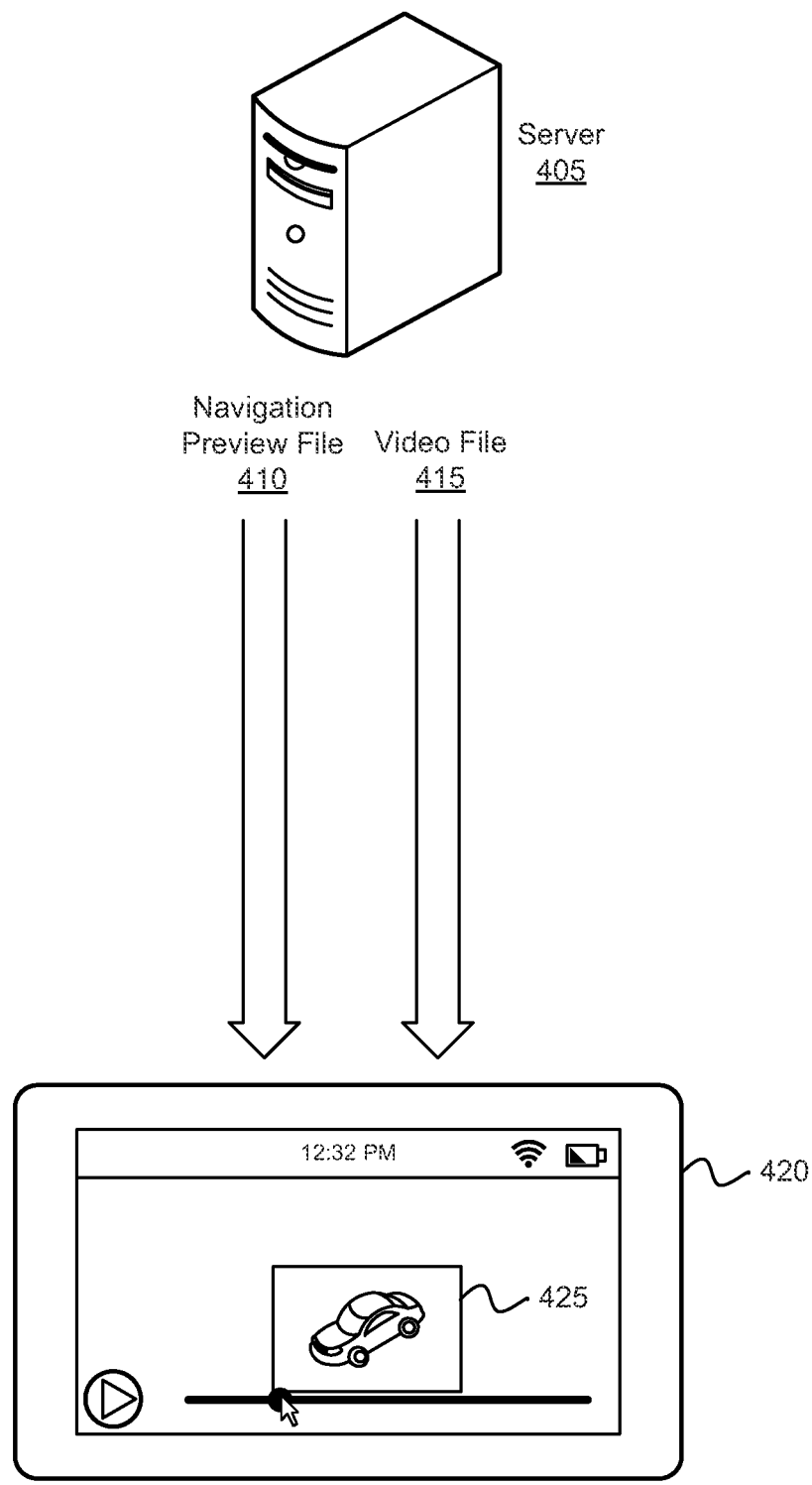
FIG. 4 is a diagram illustrating an example system and method for providing a navigation preview file for a video along with a video file.

As illustrated in FIG. 4, a server 405 may transfer a video navigation preview file 410 to a client device 420 at the same time as an associated streaming video file 415. By providing a client device 420 with the video navigation preview file 410 at the same time as the associated streaming video file 415, a customer may have access to a navigation preview 425 for the full length of the video or content program at or near the same time that the streaming video file 415 begins playing on the client device 420. Further, because the content images contained in the video navigation preview file 410 may be arranged in a way that may provide a rough granular overview of the entire length of the streaming video file within the initial number of content images received by the client device 420, a customer may access the navigation preview 425 on the client device 420 and be presented with a content image for one or more segments of the video file 415 that have not yet been received by the client device 420 from the server 405.

Figure 5:
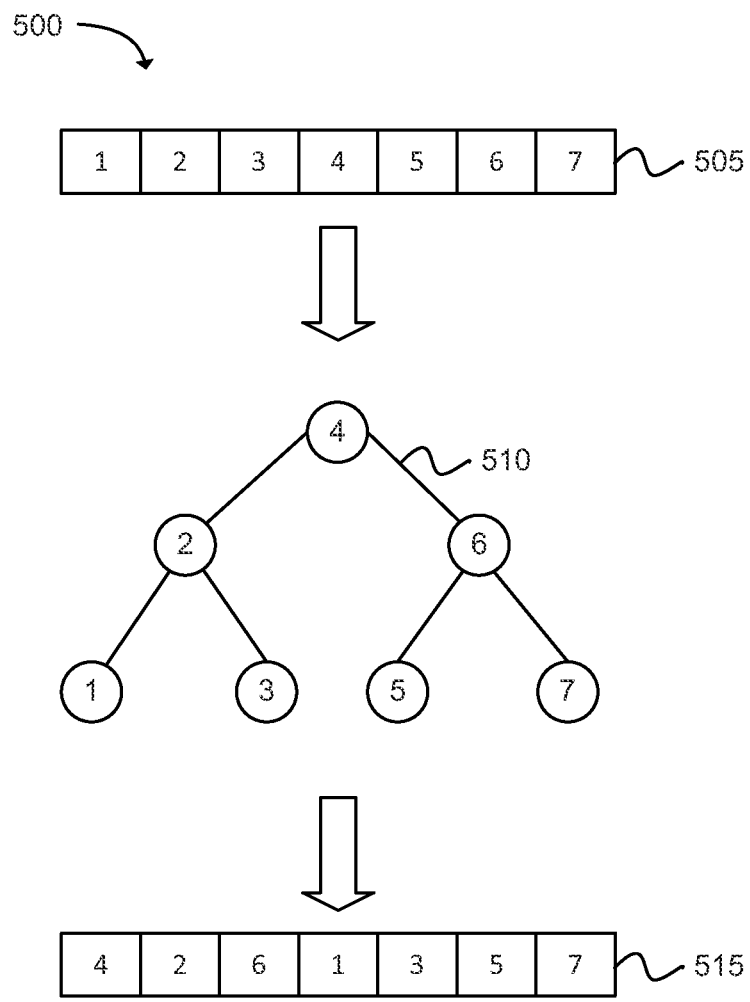
FIG. 5 is a diagram illustrating an example method for providing a navigation preview file to a client device.

Moving now to FIG. 5, an example of a method 500 is illustrated for arranging a number of content images in a video navigation preview file. A video navigation preview file 505 may contain a number of content images in a sequential order that may correspond to an associated video file. For example, a number of content images may be captured from a video file for predetermined segments (e.g., chapters, time periods, etc.) of the video. Predetermined segment may be based upon a desired granularity of a navigation preview. For instance, a predetermined segment may be every five minutes, one minute, every half minute, every 15 seconds, etc. of a video. As a result, a content image displayed in a navigation preview may represent a segment of an associated video and the segment may be a length of time in the video. Existing techniques place content images in a video navigation preview file 505 in an order that may correspond to the sequence of an associated video. For example, the first position of a video navigation preview file 505 may contain a content image from the beginning of an associated video and subsequent content images may be placed in the video navigation preview file 505 sequentially. A fortiori, the last position of the video navigation preview file 505 may contain a content image from the ending of the associated video.

The example method 500 may rearrange the content images of the video navigation preview file 505 by constructing a tree data structure, such as a binary tree or an N-ary tree based upon the content images of the video navigation preview file 505. In one example, a binary tree data structure 510 may be constructed by mapping the content images of the video navigation preview file 505 to the nodes of the binary tree data structure 510. For example, the content image in the middle or nearest the middle of the video navigation preview file 505 may be placed in the root position of the binary tree data structure 510 (e.g., content image with index value 4). The content image from the first quarter of the video navigation preview file 505 may be placed in the root's left child node (e.g., content image with index value 2) and the content image from the last three quarters of the video navigation preview file 505 may be placed in the root's right child node (e.g., content image with index value 6). The binary tree data structure 510 may continue to be constructed in the same manner by continuing to sub-divide the different sections of the video navigation preview file 505 and mapping the resulting indexed content image to the nodes of the binary tree data structure 510.

Once the binary tree data structure 510 may have been constructed, the example method 500 may include a search process that may traverse the binary tree data structure 510. The example method 500 may arrange a collection of content images that may be placed in a video navigation preview file 515 based upon the search process' traversal of the binary tree data structure 510. In one example, a level order traversal may be used to produce an ordering of content images. A level order traversal method may be a method that begins at the root of a binary tree data structure and continues down the binary tree by individual levels while traversing each child node before continuing down to the next level of the binary tree.

Traversing the binary tree data structure 510 using a level order traversal method may provide an ordering of content images in the video navigation preview file 515 that systematically disperses the content images representing the different segments of a video throughout the video navigation preview file 515. For example, when the video navigation preview file 515 is received on a client device, the content image in the first position of the video navigation preview file 515 may be a content image from the middle or near the middle of the video (i.e., index value 4 of 7 in the navigation preview). The following content image in the video navigation preview file 515 may be a content image from somewhere nearer the beginning of the video (i.e., index value 2 of 7 in the navigation preview). As additional content images may be received (i.e., index value 6 of 7 in the navigation preview) by the client device, further indexed locations of the navigation preview may be filled with the received content images. Within the first few content images being received by the client device, a customer may be provided with a rough granular overview of the entire length of the video via the navigation preview. Continuing the example, the next content images received (i.e., 1, 3, 5 and 7) may fill out the navigation preview by providing content images that fill in gaps between already received content images in the navigation preview. Once an entire set of content images may have been received, the navigation preview may contain a content image for each of the navigation preview's indexed locations.

As will be appreciated, the example above has been simplified in order to explain the example method. The number of screenshots that may be contained in a video navigation preview file may vary depending upon the length, quality and other factors of a video. For example, a video navigation preview file 515 may contain hundreds, thousands or even more content images. Also, many other similar or different arrangements of content images in a video navigation preview file are possible. The example arrangements discussed above are merely representative and not limiting.

Figure 6A:
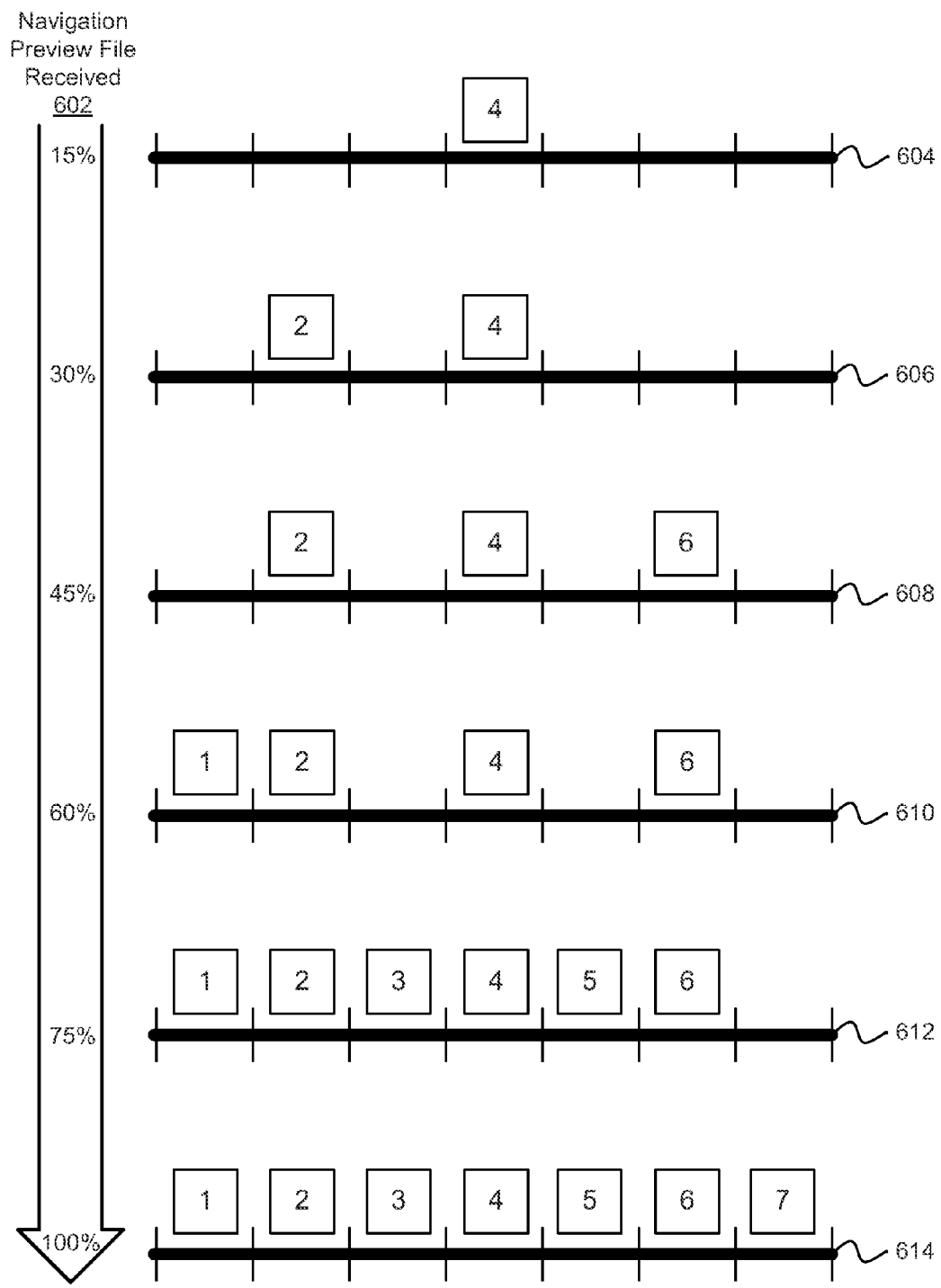
FIGS. 6a-6b are diagrams illustrating an example of providing a navigation preview file on a client device.

FIG. 6a is an illustration of one example of a method for providing a video navigation preview file on a client device. FIG. 6a illustrates progressively inserting content images into a video player application's navigation preview control. The content images may be inserted into the navigation preview control as a video navigation preview file is received 602 by the video player application on the client device. As a video navigation preview file may be received 602 by an application, content images contained in the video navigation preview file may be inserted into an indexed position of an application's navigation preview. For instance, upon receiving the initial 15% of a video navigation preview file 602, the first content image that may be received by an application may be a content image with an assigned index value of 4. The application may examine the assigned index value of the content image and insert the content image into an indexed position of the application's navigation preview 604 with an index value that matches the content image's assigned index value (i.e., navigation preview index value position 4). In this example, the index value of the navigation preview 604 where the content image may be inserted may be near the middle of the video.

As the video navigation preview file continues to be received on the client device, the next content image that may be received by the application may be a content image with an assigned index value of 2. Upon receiving the content image, the application may insert the content image into indexed position 2 of the application's navigation preview 606. The indexed position of the navigation preview 606 where the content image may be inserted may be near the beginning of the video that the content image represents.

As the video navigation preview file nears the half-way point of being received on the client device, a content image with an assigned index value of 6 may be received by the application and placed in the navigation preview 608 at indexed position 6. At this point in the example, a customer viewing a video on the client device may have a rough granular overview of the length of the video. The customer may see a content image for the beginning, middle and ending of the video. At the 60% point of the video navigation preview file being received 602, a content image with an assigned index value of 1 may be received and placed in the navigation preview 610. At this point in the example, the navigation preview 610 may have become more granular, in that most positions of the of the navigation preview 610 may now be occupied by a content image. Empty indexed positions of the navigation preview 612 may be filled with correlating content images as the application receives the content images. Upon receiving 100% the video navigation preview file 602, the indexed positions of the application's navigation preview 614 may now be occupied by a content image with a correlating index value, thus providing the customer with a navigation preview 614 that provides a content image for every available position of the navigation preview 614.

Figure 6B:
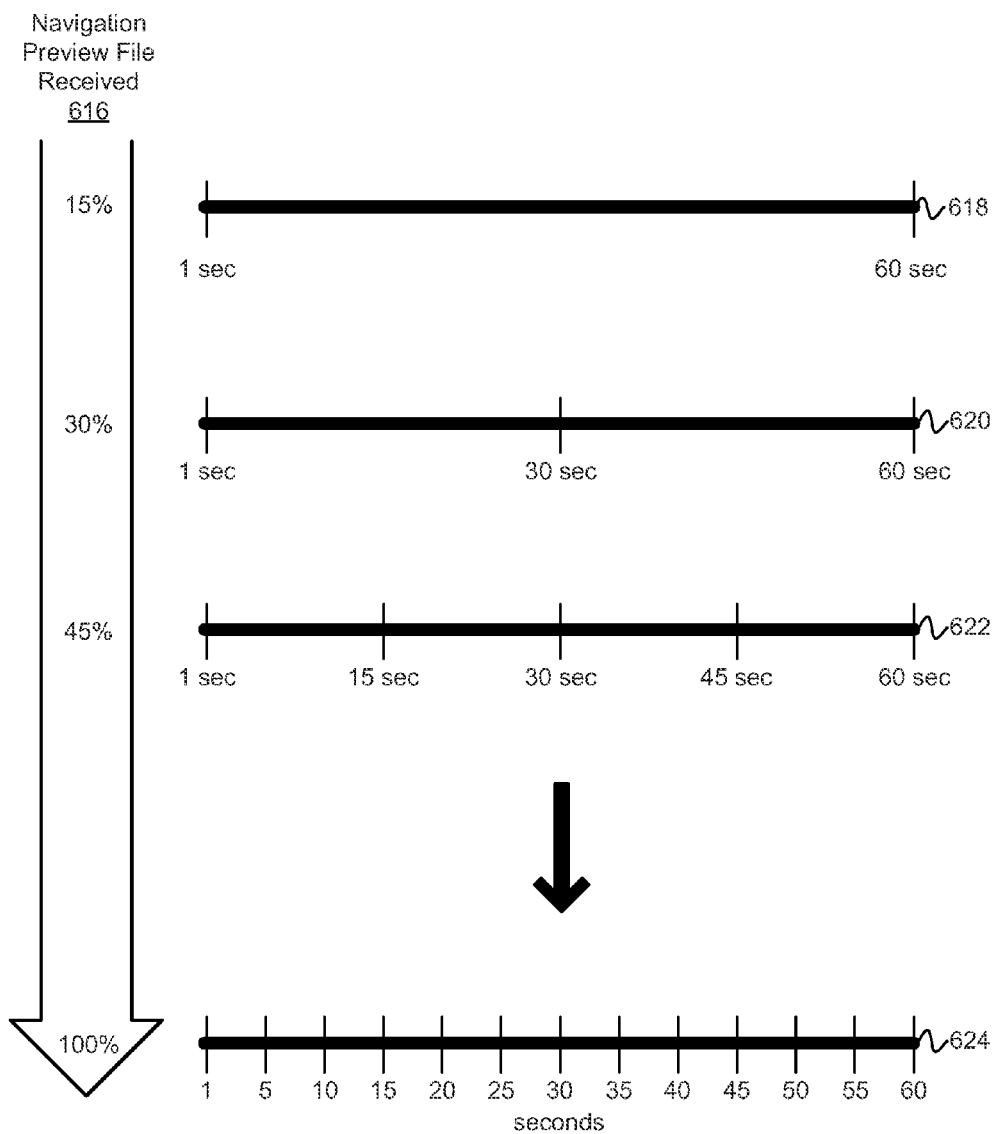

FIG. 6b is an illustration of an example of a method for providing a video navigation preview file on a client device. FIG. 6b is an example of progressively providing a number of content images to a navigation preview incorporated into an application that displays video on a client device. As a video navigation preview file may be received 616 on a client device, a number of content images may be contained in the video navigation preview file that may be placed into a navigation preview 618. The content images may be arranged in the video navigation preview file so that when received, the content images may represent predetermined segments of a streaming video.

In this example, as the video navigation preview file may be progressively received 616, content images may be placed in the navigation preview in an order that provides a customer with an incremental granular overview of the video. For example, a customer may initially be presented with a content image for every one minute of a video, and then the preview progresses to provide content images for every 30 seconds of the video, then to every 15 seconds of the video and so forth, until the customer is presented with a navigation preview that contains a content image for every five seconds of the video. As an illustration, content images from the first 15% of the video navigation preview file may contain content images that may be indexed so that when the content images are placed in the navigation preview 618, each content image may represent a one minute segment of the video. Once 30% of the video navigation preview file may have been received by the application, the navigation preview 620 may provide a content image representation for every 30 seconds of the video. Upon receiving 45% of the video navigation preview file, the navigation preview 622 may contain a content image representation for every 15 seconds of the video. The progression of receiving and placing content images into the application's navigation preview may continue until finally, when 100% of the video navigation preview file has been received by the application, the navigation preview 624 may contain a content image representation of the video for every five seconds of the video. Of course various arrangements of content images in a video navigation preview file other than those described in FIGS. 6a and 6b may be used. Many other similar or different arrangements of content images in a video navigation preview file are possible.

Figure 7:
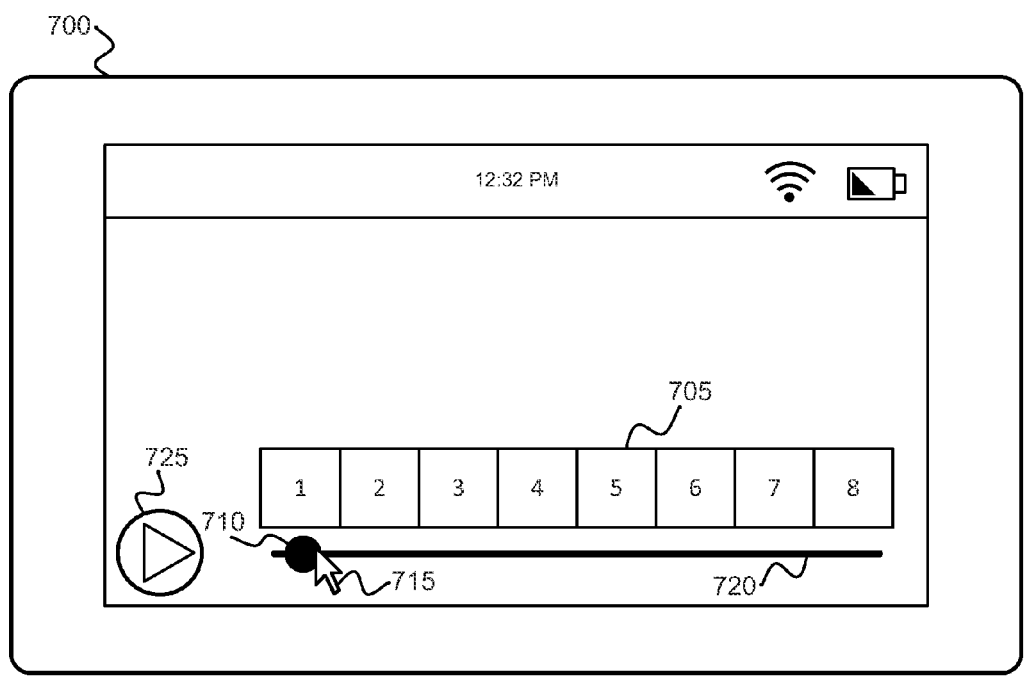
FIG. 7 is a diagram illustrating an example client device upon which the technology may be displayed.

FIG. 7 is a diagram illustrating an example client device 700 upon which the technology may be displayed. The client device 700 may be any device capable of receiving and playing a video file over a network. For instance, a client device 700 may be a device such as a tablet computer, laptop or notebook computer, an e-book reader or other devices with like capability. The client device 700 may include a software application capable of playing video files. In addition, the application may include computer-generated navigation controls, such as a play button 725 used to start and stop a video, a time bar 720 that may provide a visual representation of the time length of a video, a navigation bar 710 that may be used to move a video forward or backward in time depending upon the current play position of the video and a navigation preview 705 that may be associated with the navigation bar 710.

The navigation preview 705 associated with the navigation bar 710 may display content images contained in the navigation preview 705 when the navigation bar 710 may be accessed by a customer. For example, some client devices 700 may include a cursor 715 that may be controlled using a pointer device, such as a computer mouse. When a customer clicks the navigation bar 710, drags the navigation bar 710, hovers over the navigation bar 710, etc., a portion of the navigation preview 705 may be displayed to the customer. In other words, one content image from the navigation preview 705 may be shown at a time based on where the cursor 715 has been located by the customer. Alternatively, the content images in the navigation preview 705 may be displayed at the same time and the customer can pick the desired content image that corresponds to a segment of the video. In addition, client devices 700 having a touch screen may display a navigation preview 705 when a customer touches the navigation bar 710 displayed on the touch screen. Customers using client devices 700 such as smart TVs or game consoles may, for example, display the navigation preview 705 using a remote control, game pad or other device used to control the client device 700. The cursor 715 may also be accessed using an optical capture type of input. Of course different client devices 700 may be controlled using a number of different methods and devices. The discussion above is meant merely as an example and is not limiting.

The client device 700 may receive a video file while a video navigation preview file is loading from a server. The video navigation preview file may contain a number of content images (e.g., still images) captured from the video and the content images may be arranged so that the order of content images in the video navigation preview file provides a low granularity preview of the entire length of the video when the initial content images are received by the application and placed in the navigation preview 705. The granularity of the navigation preview 705 may increase as the video navigation preview file is progressively received across a network.

After receiving a content image, the application may insert the content image into a defined location of the navigation preview 705. The navigation preview 705 may be divided into a number of indexed defined locations. Each indexed location may be associated with a segment and/or scene of the video file being received with the video navigation preview file. A content image may have an index value that may be associated with an indexed defined location within the navigation preview. Upon inserting a content image into the navigation preview 705, the content image may be available to view in the navigation preview 705. For example, the content images may be received in a non-sequential order that may provide a customer with a low granularity preview of the video. Therefore as the content images are received and inserted into the navigation preview 705, the content image may be visible in the navigation preview 705 before subsequent content images may be received. To illustrate, a defined location in the navigation preview 705 with an index value of 5 may contain an associated indexed content image that may be displayed to a customer in the navigation preview 705 before a preceding defined location (e.g., location 4) that may be empty (i.e., does not contain a content image yet).

In an alternate example, the preceding or subsequently defined locations for a navigation preview 705 may be temporarily populated with a placeholder until the content image with an index value matching the index value of the defined location may be received. A placeholder may show, for example, a time value associated with a play point in the video, a video title page, a scene title and/or index value, etc. For example, where a navigation preview 705 may contain 8 indexed locations, and locations 4 and 8 of the navigation preview 705 may contain content images with matching indexes (i.e., 4 and 8), those locations preceding location 4 (i.e., locations 1, 2 and 3) may temporarily contain a placeholder. In other words, locations 1, 2 and 3 of the navigation preview 705 may contain a placeholder that, for example, shows a time value associated with the location. Likewise, those locations preceding location 8 of the navigation preview 705 (i.e., locations 5, 6 and 7) may temporarily contain a placeholder. As the content images indexed 1, 2, 3, 5, 6 and 7 are received, these content images may replace the temporary placeholder in the corresponding location of the navigation preview 705.

In another alternative example, as content images are received on a client device 700, the content images may be placed in a tree data structure. When a customer accesses the navigation bar 710, the navigation preview 705 may execute a method that retrieves a corresponding content image from the tree data structure for the time point of the video that the navigation bar 710 represents. The method executed by the navigation preview 705 may use a depth first search to locate the content image in the tree data structure that correlates to a position which most closely matches the actual time point of the navigation preview 705 being accessed. For example, a customer may move the navigation bar 710 to a point in the video (e.g., the 12 minutes and 45 seconds point) that has yet to receive a content image representing that particular point in the video. The navigation preview 705 may instead be provided with a content image (e.g., from the 10 minute point using the depth first search) that most closely represents the point in the video that the customer may be trying to access. The content image may be located by utilizing a depth first search of the tree data structure.

Figure 8:
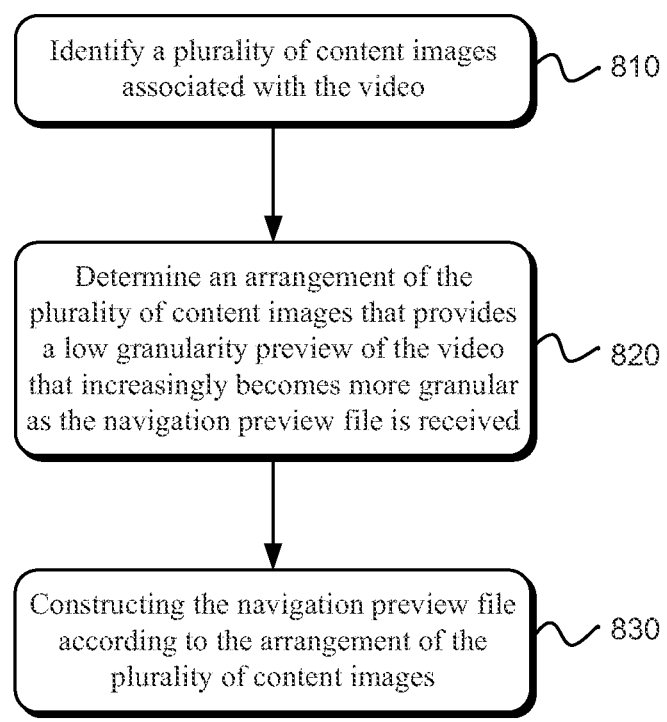
FIG. 8 is a flowchart illustrating an example of a method for providing a navigation preview file.

FIG. 8 is a flowchart illustrating an example of a method for providing a video navigation preview file to a client device. Starting in block 810, a number of content images associated with a video may be identified. The content images associated with the video may be still images captured from the video. For example, a still image may be captured from a particular segment and/or scene from a video. In another example, still images may be captured from a video based upon a predetermined interval, such that a still image may be captured for every minute, 15 seconds, or other interval of time from a video.

As in block 820, an arrangement may be determined that orders the content images so that a low granularity preview of the video may be provided that increasingly becomes more granular as the video navigation preview file is received on a client device. In one example, the content images may be retrieved from a tree data structure and may be arranged in the video navigation preview file according to an order returned from a search method that traverses the tree data structure. For example, a level order traversal method of the tree data structure may provide a sort order that may be used to arrange the content images in the video navigation preview file.

In an alternative example, an arrangement of content images may be made based upon a binary division method. The binary division method may determine an ordering of content images by taking the total number of sequentially ordered content images and dividing the number in half. The result may be used to find a content image with an index value matching the result and the content image may then be placed in the first position of the video navigation preview file. The binary division method may continue to iteratively divide the segments created as a result of the prior calculation. As each calculation provides a result, a content image with a corresponding index value may be placed in the video navigation preview file in the sequence of the calculation result. As another example, the method may be performed by dividing the total number of sequentially ordered content images into thirds or fifths (or other subdivision amounts), and then iteratively dividing the resulting segments by similar amounts and placing the content images with corresponding index values into the video navigation preview file in the sequence of the calculation results.

In another example, the arrangement of content images may be ordered based upon a resume point associated with a play position in a video file. For example, after watching part of a video, a customer may at a later time start the video from the point that the customer stopped watching. The point in the video that the customer stopped watching may be used as a resume point by an example method that arranges screenshots in a video navigation file based upon the resume point. For instance, based upon the resume point that may represent where the customer may resume watching the video, the content images may be arranged in the video navigation preview file so that the navigation preview for the unwatched portion of the video may be populated before the rest of the navigation preview may be populated. In another example, a resume point may be determined based upon a customer's behavior. For example, in a case where a customer regularly skips to a certain segment of a video, a resume point may be created and used to arrange content images in a video navigation preview file for the associated video and sent to a client device used by the customer. For instance, when the customer begins watching the video, the navigation preview may first provide a content image for the segment of the video that the customer regularly skips to. For example, in a case where a customer regularly skips to a favorite action scene, the content images in the video navigation preview file may be arranged so that the first content image in the video navigation preview file may be a content image for the customer's favorite action scene. Thus, when the video navigation file is received, the content image may be placed in the navigation preview and be made available to the customer. Used in another example, a resume point may allow a customer to skip past a segment of a video. For instance, a customer may skip previews that may play prior to the main feature of the video by selecting the content image that represents the resume point.

As in block 830, the video navigation preview file may be constructed according to the arrangement of the content images determined in block 820. Further, the video navigation preview file may be made available to a client device. Upon receiving the video navigation preview file and placing the content images contained in the received video navigation preview file into a navigation preview as the content images are received, a customer may be presented with a navigation preview that provides a low granular overview of the entire length of the video that may progressively become more granular as additional content images are received.

Figure 9:
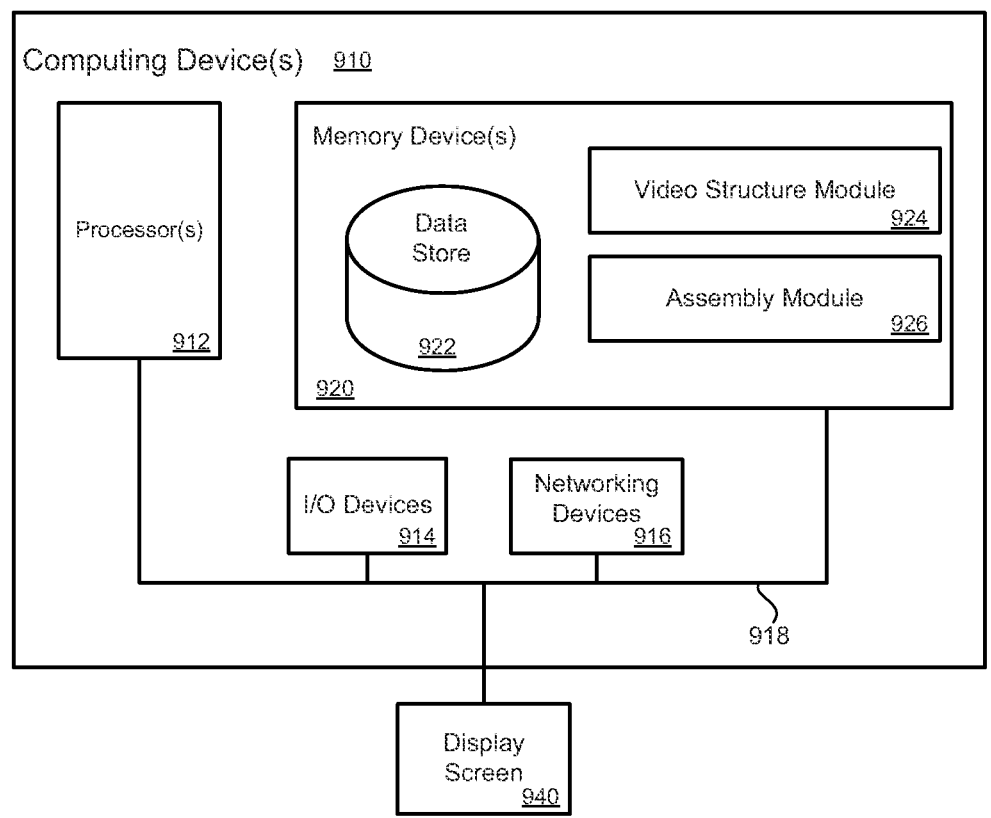
FIG. 9 is block diagram illustrating an example of a computing device that may be used to execute a method for providing a navigation preview file.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface may be a local data bus and/or any related address or control busses as may be desired.

The memory device 920 may contain modules that are executable by the processor(s) 912 and data for the modules. Located in the memory device 920 are services and modules executable by the processor. For example, a video structure module 924, an assembly module 926 and other modules may be located in the memory device 920. The modules may execute the functions described earlier. A data store 922 may also be located in the memory device 920 for storing data related to the modules and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen 940 that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for providing a navigation preview file with a preview for an entire length of a streaming video, comprising:
    under control of one or more computer systems configured with executable instructions:
        storing a plurality of content images in a tree data structure that are to be included in the navigation preview file;
        determining an arrangement of the plurality of content images for the navigation preview file using a level order traversal of the tree data structure, the arrangement initially providing a preview with a low granularity preview of an entire length of the streaming video and the preview increasingly becomes more granular as the navigation preview file is progressively transferred across a network and the preview includes a complete preview of the streaming video when the navigation preview file is completely transferred;
        constructing the navigation preview file according to the arrangement; and
        providing the navigation preview file.

2. A method as in claim 1, further comprising constructing the tree data structure using the plurality of content images where a node of the tree data structure is associated with a navigation image from the plurality of content images.

3. A method as in claim 1, wherein the tree data structure is a binary tree data structure.

4. A method as in claim 1, wherein providing the navigation preview file further comprises providing the navigation preview file concurrently with the video.

5. A method as in claim 1, wherein the video is streamed from a server to a plurality of client devices.

6. A method for providing a navigation preview file that provides a preview of an entire length of a video, comprising:
    under the control of one or more computer systems configured with executable instructions:
        identifying a plurality of content images associated with the video;
        determining an arrangement of the plurality of content images using a level order traversal of a tree data structure containing the plurality of content images, the arrangement providing a preview with a low granularity preview of the entire length of the video and the preview increasingly becomes more granular for the entire length of the video as the navigation preview file is received; and
        constructing the navigation preview file according to the arrangement of the plurality of content images.

7. The method as in claim 6, further comprising providing the navigation preview file to a client device.

8. The method as in claim 7, wherein the navigation preview file is provided concurrently with the video delivered to the client device.

9. The method as in claim 6, wherein the plurality of content images are a plurality of still images captured from the video.

10. The method as in claim 9, wherein the plurality of still images are captured from the video at predetermined intervals from the video, whereby a navigation preview of the video is provided by the plurality of still images.

11. The method as in claim 6, wherein arranging the plurality of content images further comprises arranging the plurality of content images based upon an index value determined by a play point in the video.

12. A non-transitory machine readable storage medium, including program code, when executed to cause a machine to perform the method of claim 6.

13. A system for providing a video navigation preview file, comprising:
    a processor;
    a memory device including instructions that, when executed by the processor, cause the processor to execute:
    a video structure module configured to build a data structure from a source file containing a plurality of content images for a video; and
    an assembly module configured to assemble the video navigation preview file from the data structure according to an arrangement using a binary division method to iteratively divide the index range of the data structure into segments to identify an index value for content images that are equal to a result of the division and placing the content images in the video navigation preview file;

providing a low granularity preview covering an entire length of the video that increases in granularity as the video navigation preview file is progressively transferred across a network and provides a complete preview of the entire length of the video when the navigation preview file is completely transferred.

14. The system as in claim 13, wherein the video structure module is configured to build a tree data structure from a source file containing the plurality of content images arranged in sequential sequence.

15. A method for providing a video navigation preview that provides an initial preview covering an entire length of a video, comprising:

under control of a computer system configured with executable instructions:

receiving a video file and a navigation preview file containing a plurality of content images arranged using a level order traversal of a tree data structure, a navigation preview file arrangement providing a low granularity preview covering the entire length of the video, increased granularity as the navigation preview file is progressively received across a network, and a complete preview when the video navigation preview file is completely transferred;

inserting a content image from the plurality of content images in a defined location of the video navigation preview as the navigation preview file is received; and providing the content image in the video navigation preview.

16. The method as in claim 15, further comprising displaying the content image in the video navigation preview.

17. The method as in claim 15, wherein the video navigation preview is associated with a navigation bar used to navigate the video.

18. The method as in claim 17, further comprising displaying images for the video navigation preview when the navigation bar is accessed by a user.

19. The method as in claim 15, further comprising using a depth first search to locate a content image in a tree data structure that most closely correlates to a position of the video navigation preview being accessed.

* * * * *